2,750,402

6,7-DIACETYL-1,2,3,4,4a,9,10,10a-OCTAHYDRO-1,4a-DIMETHYL-9-OXOPHENANTHRENE - 1 - CARBONITRILE

Thomas F. Sanderson, Wilmington, Del., assignor to Hercules Powder Company, Wilmington, Del., a corporation of Delaware No Drawing. Application May 2, 1955, Serial No. 505,515

3 Claims. (Cl. 260—465)

This application relates to the novel compound derivable from dehydroabietonitrile and to its process of preparation. More specifically, it relates to 6,7-diacetyl-1,2,3,4,4a,9,10,10a-octahydro-1,4a-dimethyl-9-oxophenanthrene-1-carbonitrile and to its method of preparation.

In accordance with the present invention, it has been found that dehydroabietonitrile can be acetylated to form 6-acetyldehydroabietonitrile and that upon oxidation of the 6-acetyldehydroabietonitrile with anhydrous chromium trioxide the isopropyl group at the 7 position is replaced by an acetyl radical and an oxo group is introduced at the 9 position giving as a product the valuable and novel compound 6,7-diacetyl-1,2,3,4,4a,9,10,10a-octahydro-1,4a-dimethyl - 9 - oxophenanthrene-1-carbonitrile having the formula

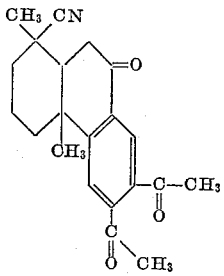

The following example is presented to illustrate the invention. Parts and percentages are by weight.

Example

Into a reaction vessel equipped with a stirrer and condenser there was placed 281 parts of dehydroabietonitrile, 2400 parts of tetrachloroethane and 86 parts of acetyl chloride. The reaction mixture was stirred at room temperature and 288 parts of AlCl₃ was added slowly over a period of one hour. Thereafter, the reaction mixture was stirred at the same temperature for 46 hours.

At the end of this time, the reaction mixture was poured into a vessel containing 2000 parts of ice and about 770 parts of concentrated hydrochloric acid. The aqueous acid layer was separated and the upper organic layer washed several times with water. The solvent was removed by steam distillation and the product, 6-acetyl-dehydroabietonitrile, which crystallized on cooling, was separated by filtration. The crystals were dried, ground and extracted with about 150 parts of boiling petroleum ether (to remove unreacted nitrile), cooled, filtered and dried. The product amounted to 310 parts, M. P. 155° C.

A portion of the 6-acetyldehydroabietonitrile amounting to 16.15 parts was dissolved in a mixture of approximately 420 parts of acetic acid and 485 parts of acetic anhydride. The solution was cooled to 20° C. and 23.33 parts of solid chromium trioxide was added over a period of 7 hours. After stirring overnight at room temperature, the resultant dark green solution was poured into ice water and the precipitate filtered. The precipitate was then dissolved in ether, washed with water, dried over sodium sulfate, filtered, and then evaporated to dryness to yield 15.18 parts of a solid oxidate as residue.

The crude oxidate was next dissolved in 50 parts of benzene and the solution was separated chromatographically on a column of basic alumina 48 inches in length and 1.5 inches in diameter. The column of alumina was next eluted with benzene. In the first 8 fractions, 45 parts of benzene was used each time and the 8 eluates were combined and evaporated. This left a residue melting at 150–200° C. which was discarded.

In the next 4 fractions, a total of 3250 parts of benzene was used. These eluates were evaporated to 5.95 parts of a crystalline material melting at 240° C. This material was recrystallized from ethyl acetate to obtain 2.85 parts of crystalline material melting at 262–263° C. Analysis—calculated for C₂₁H₃₃O₃: C, 74.75; H, 6.87; N, 4.15; found: C, 75.06; H, 6.73; N, 4.24. The compound was thus identified as 6,7-diacetyl-1,2,3,4,4a,9,10,-10a-octahydro-1,4a-dimethyl - 9 - oxophenanthrene-1-carbonitrile.

The dehydroabietonitrile which serves as a starting reactant in accordance with the invention can be prepared by any of several methods known to the art. One illustrative method is disclosed in U. S. Patent No. 2,534,297 wherein stabilized rosin nitriles are prepared by reacting dehydrogenated rosin in liquid phase with gaseous ammonia.

In accordance with the invention, dehydroabietonitrile is first converted to the 6-acetyl derivative of the nitrile. This can be done by a Friedel-Crafts ketone synthesis as illustrated in the example using acetyl chloride and anhydrous aluminum chloride. The techniques of this synthesis and the possible variations thereof will be readily apparent to those skilled in the art.

The 6-acetyldehydroabietonitrile is next oxidized by heating a mixture of the nitrile, chromium trioxide and acetic anhydride. The function of the latter compound is to combine with the water produced during the reaction and thus maintain an anhydrous system. It is, therefore, used in an amount which is at least stoichiometrically sufficient to combine with the liberated water but an excess can be used without detriment. It has been found that maintaining an anhydrous system promotes the desired attack on the isopropyl group of the nitrile without interfering with the oxidative attack at the 9 position.

The acetic anhydride will itself serve as an inert reaction medium, but it is helpful to use an additional solvent for the reactants in order to minimize precipitation of chromium salts. Exemplary of the solvents which may be used are the carboxylic acids, such as acetic acid, propionic acid, dichloracetic acid, etc.; alcohols, such as tert-butyl alcohol, etc. Of particular value is an acid such as acetic acid because it is an excellent solvent for the 6-acetyldehydroabietonitrile and also dissolves chromium trioxide. The amount of solvent used in carrying out the reaction is immaterial but should be an amount such that the reacting solution is easily agitated. In general, the amount of solvent which is used is the amount which will result in a 5–25% solution of the nitrile. A more concentrated solution of the nitrile may be used but is difficult to handle. In the same way, larger amounts of solvent may be used but are not generally employed because of the bulk of the reaction mixture which must then be handled.

The amount of chromium trioxide which is used to oxidize the 6-acetyldehydroabietonitrile in accordance with the invention can be varied depending upon the degree of oxidation desired but, in general, is an amount ranging from about 1 mole to about 5 moles per mole of nitrile. In the preceding examples, the amount of chromium trioxide used was equal to approximately 4.5 moles per mole of nitrile, this being the amount stoichiometrically required for the production of the desired product.

In general, the oxidation is carried out at a temperature of from about 20° C. to 60° C. and preferably from about 25° C. to about 35° C.

As shown in the example, the oxidation of the 6-acetyldehydroabietonitrile leads to a crude product which comprises about 28% of the desired product which can be separated with relative ease. One method of achieving this separation is illustrated in the example and comprises chromatographic adsorption on basic alumina using benzene as the solvent. In addition to benzene, other solvents, such as methylene chloride, petroleum ether, heptane, isooctane, diethyl ether, cyclohexane, methyl cyclohexane, p-menthane and dipentene, can be used.

The compound of the invention is a valuable new product useful in many ways. One of its most interesting uses is that of an intermediate in the chemical synthesis of compounds having a structure similar to those active cardiotonic principles found in various plants.

In addition, the two acetyl groups of the compound can be converted to carboxyl groups. The resulting analog of phthalic acid can be esterified to produce esters useful as plasticizers in synthetic materials, particularly cellulose ethers and esters.

The compound is further useful as an intermediate for the preparation of an amine triol having the formula

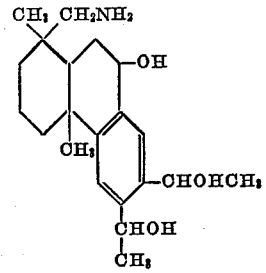

which in turn is a useful anticorrosion agent. The amine triol is prepared by reducing the compound of the invention by any of several standard reduction methods. For instance, the compound is hydrogenated in the presence of a Raney nickel catalyst at a pressure of 2000 p. s. i. and a temperature of 150° C. The effectiveness of the amine triol as an anticorrosion agent is shown by the fact that it prevents the corrosion of mild steel in acidic water when dissolved therein in a concentration of 0.5% by weight.

What I claim and desire to protect by Letters Patent is:

1. 6,7-diacetyl-1,2,3,4,4a,9,10,10a-octahydro-1, 4a-dimethyl-9-oxophenanthrene-1-carbonitrile.

2. A method of preparing 6,7-diacetyl-1,2,3,4,4a,9,10, 10a - octahydro - 1,4a - dimethyl-9-oxophenanthrene-1-carbonitrile which comprises oxidizing 6-acetyldehydroabietonitrile by contact with chromium trioxide under anhydrous conditions.

3. The method of claim 2 in which the oxidation is carried out at a temperature from about 20 to 60° C. in the presence of acetic anhydride in an amount to combine with the water produced during the oxidation.

References Cited in the file of this patent
UNITED STATES PATENTS

| | | |
|---|---|---|
| 2,703,796 | Ritchie | Mar. 8, 1955 |
| 2,704,283 | Jacobsen | Mar. 15, 1955 |

OTHER REFERENCES

JACS, vol. 73, pp. 3803–07 (1951).